US 8,275,639 B2
Sep. 25, 2012

(12) United States Patent
Guerrero

(10) Patent No.: US 8,275,639 B2
(45) Date of Patent: Sep. 25, 2012

(54) INSURANCE PRODUCT AND RELATED SYSTEM AND METHOD

(76) Inventor: John M. Guerrero, Palm City, FL (US)

(*) Notice: Subject to any disclaimer, the term of this patent is extended or adjusted under 35 U.S.C. 154(b) by 701 days.

(21) Appl. No.: 12/364,512

(22) Filed: Feb. 2, 2009

(65) Prior Publication Data

US 2009/0198527 A1  Aug. 6, 2009

Related U.S. Application Data

(60) Provisional application No. 61/063,304, filed on Feb. 1, 2008.

(51) Int. Cl.
*G06Q 40/00* (2006.01)
(52) U.S. Cl. .......................................................... 705/4
(58) Field of Classification Search ........................ 705/4
See application file for complete search history.

(56) References Cited

U.S. PATENT DOCUMENTS

2002/0077870 A1* 6/2002 Wilkinson ........................ 705/4
2003/0028406 A1* 2/2003 Herz et al. ........................ 705/4

* cited by examiner

*Primary Examiner* — James Vezeris
(74) *Attorney, Agent, or Firm* — Allen, Dyer, Doppelt, Milbrath & Gilchrist, P.A.

(57) ABSTRACT

A defendant protection policy is purchased by a plaintiff in connection with pursuing a lawsuit against a defendant, and pays out to the defendant in the event of an outcome unfavorable to the plaintiff. The plaintiff can be required to purchase the defendant protection policy by law or by contract. A computer-based system for facilitating the underwriting of the defendant protection policy includes at least one processor and computer-readable memory configured to execute a claim data entry module for receiving claim data about a litigation claim, a policy risk module for assessing insurer risk of payment under the claim based at least in part on risk data corresponding to the claim data, and a policy pricing module for determining policy pricing based at least in part on the insurer risk of payment.

8 Claims, 3 Drawing Sheets

INSURANCE PRODUCT AND RELATED SYSTEM AND METHOD

CROSS-REFERENCE TO RELATED APPLICATION

This application claims the benefit of U.S. Provisional Application Ser. No. 61/063,304, filed on Feb. 1, 2008, the contents of which are hereby incorporated by reference in their entirety.

FIELD OF THE INVENTION

The present invention relates to insurance, and more particularly, to systems and methods for facilitating the underwriting of insurance.

BACKGROUND OF THE INVENTION

In many types of litigation in the United States, a prospective plaintiff can secure legal representation on a contingent fee basis. In a contingent fee arrangement, the attorney for the plaintiff agrees to accept all or a portion of his or her fee as a percentage of any recovery ultimately obtained on behalf of the plaintiff. Contingent fee representation is more common in tort litigation, and particularly in connection with personal injury claims.

Contingent fee litigation is applauded by some as allowing poorer plaintiffs a chance to be heard in a legal system that would be cost-prohibitive if the plaintiff had to directly pay attorney's fees. On the other hand, some criticize contingent-fee litigation as greatly increasing the inducement to file frivolous litigation in the hopes of garnering a settlement.

In support of this criticism, it has been noted that a defendant generally has no claim against an ultimately unsuccessful plaintiff. As a result, contingent fee arrangements are essentially unavailable to defendants in litigation. Accordingly, the defendants, or very commonly an insurer on their behalf, are directly responsible for paying attorney's fees—even if the defendant prevails in the litigation. Thus, defendants (or their insurers) in weak or frivolous lawsuits will often agree to settle simply because the attorney's fees required to prevail are estimated to be less than a proffered settlement.

Advocates of the contingent fee system argue that, since the attorney must essentially work for free unless the plaintiff prevails, attorneys will screen out frivolous suits. However, an attorney when deciding to take a contingent fee case is limited in the available information, and must depend largely on representations made the plaintiff to assess the merits of a claim. Additionally, once the attorney has agreed to represent a given plaintiff, the attorney must abide by the plaintiff's decisions to settle or proceed with the litigation even if the attorney disagrees.

Whether or not the criticisms of contingent fee arrangements are justified, the reality is that the volume of litigation is increasing sharply, and many companies and professionals face dramatically rising insurance premiums and increasing legal costs, as a result. Some U.S. companies that can afford to do so are motivated to locate assets and business operations beyond the jurisdiction of U.S. courts, and some foreign companies are wary of expanding operations into the U.S. market. Much of the blame for these trends has been laid at the feet of contingent fee agreements creating a risk free atmosphere for plaintiffs wishing to bring lawsuits.

SUMMARY OF THE INVENTION

In view of the foregoing, it is an object of the present invention to shift some of the risk of a contingent fee filing back to the plaintiff. One way to do this would be to outright require the plaintiff to pay at least a portion of the defendant's legal fees in the event of an outcome not completely favorable to the plaintiff. However, this would likely be considered unacceptable as it might deter many meritorious plaintiffs from coming forward. As a result, it would be advantageous to spread the risk of loss among a large group of plaintiffs, thereby reducing the cost to anyone defendant.

Insurance is widely appreciated as a risk-spreading vehicle, and is widely utilized by prospective defendants. However, as contingent fee plaintiffs currently bear very little risk of loss for engaging in litigation, no insurance product has been contemplated to spread risk among contingent fee plaintiffs, as a whole.

To address this, the present invention includes a defendant protection policy that is purchased by a plaintiff in connection with pursuing a lawsuit against a defendant, and pays out to the defendant in the event of an outcome unfavorable to the plaintiff. According to aspects of the present invention, the plaintiff can be required to purchase the defendant protection policy by law or by contract. The present invention also includes a computer-based system and method for facilitating the underwriting of the defendant protection policy.

According to an embodiment of the present invention, the computer-based system includes at least one processor and computer-readable memory configured to execute a claim data entry module for receiving claim data about a litigation claim, a policy risk module for assessing insurer risk of payment under the claim based at least in part on risk data corresponding to the claim data, and a policy pricing module for determining policy pricing based at least in part on the insurer risk of payment.

According to a method aspect, the method includes receiving an application for the litigation defendant protection policy, inputting claim data about a litigation claim into a computer system, using the computer system to calculate insurer risk of payment under the claim based at least in part on risk data corresponding to the claim data, using the computer system to determine policy pricing based at least in part of the calculated insurer risk of payment, issuing the litigation defendant protection policy to the plaintiff upon receipt of payment, and paying a defendant as required under conditions of the defendant protection policy.

These and other objects, aspects and advantages of the present invention will be better understood in view of the drawings and following detailed description of a preferred embodiment.

DETAILED DESCRIPTION OF PREFERRED EMBODIMENTS

Figure 1:
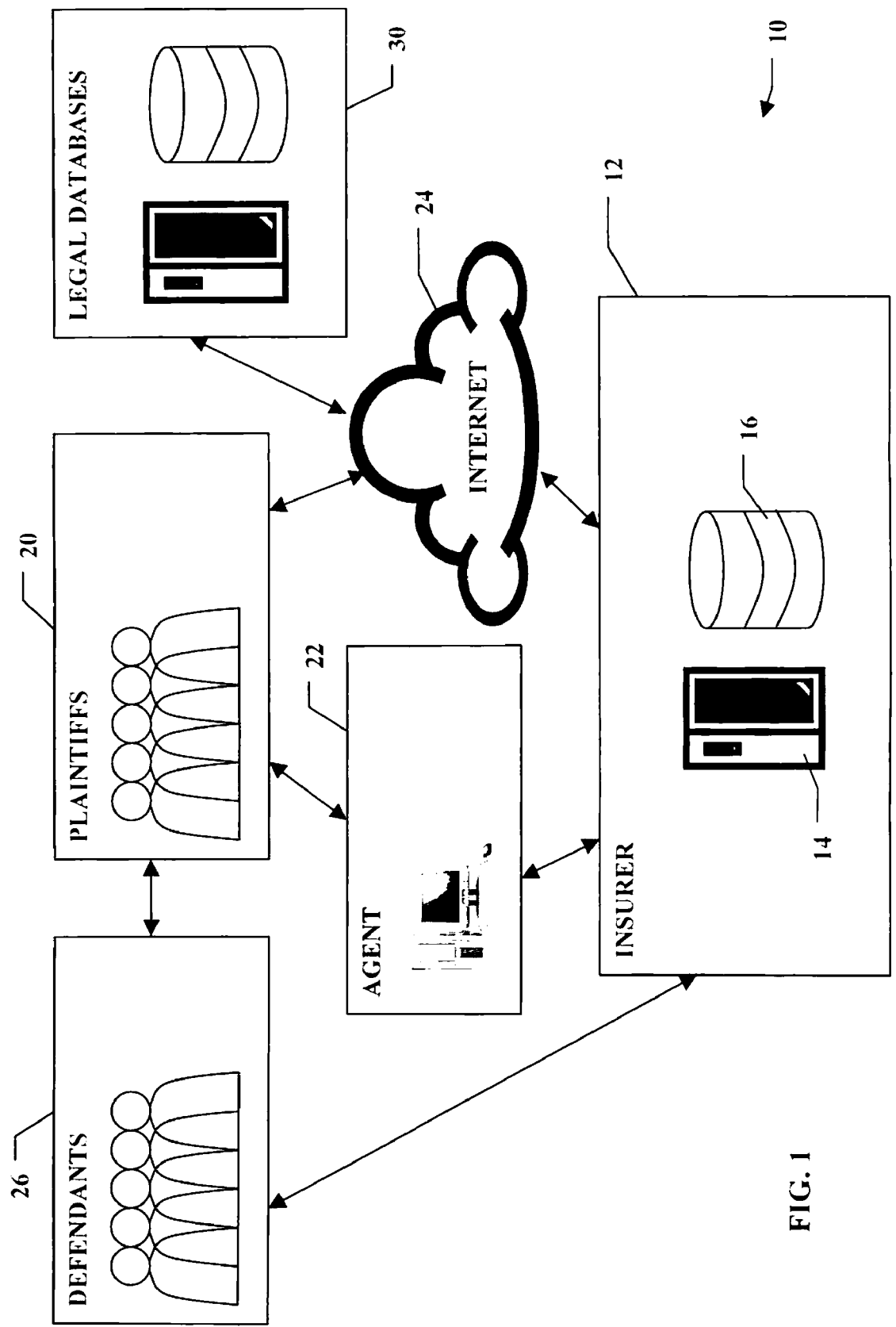
FIG. 1 is a schematic organizational diagram of a computer-based system for facilitating the underwriting of a defendant protection policy, according to an embodiment of the present invention.

Referring to FIG. 1, a computer-based system 10 for facilitating the underwriting of a defendant protection policy, according to an embodiment of the present invention, includes an insurer 12 operating a processor 14 in signal communication with computer-readable memory 16. The system 10 communicates with a plurality of plaintiffs either through one or more agents 22 or through a network medium, such as the Internet 24. The insurer 12 also communicated with a plurality of defendants 26 and one or more legal databases 30.

Figure 2:
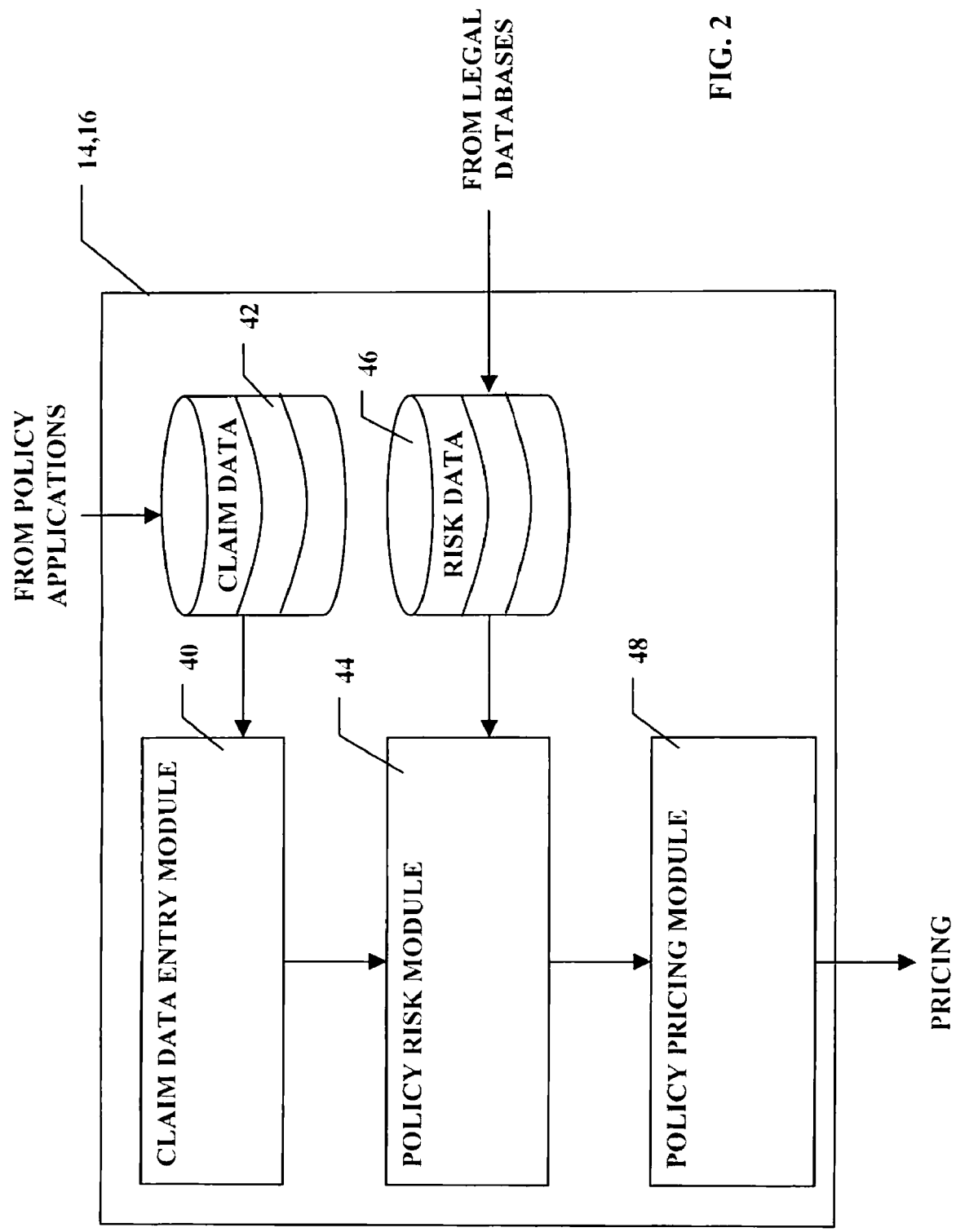
FIG. 2 is a schematic organizational diagram of modules of the computer-based system of FIG. 1.

Referring to FIG. 2, the processor 14 and computer-readable memory 16 are configured to execute a claim data entry module 40, a policy risk module 44 and a policy pricing module 48. The claim data entry module 40 receives claim data 42 derived from policy applications. Based at least in part on the claim data 42, the policy risk module 44 calculates an insurer 12 risk of payment. Based at least in part of the insurer 12 risk of payment, the policy pricing module 48 outputs policy pricing.

Figure 3:
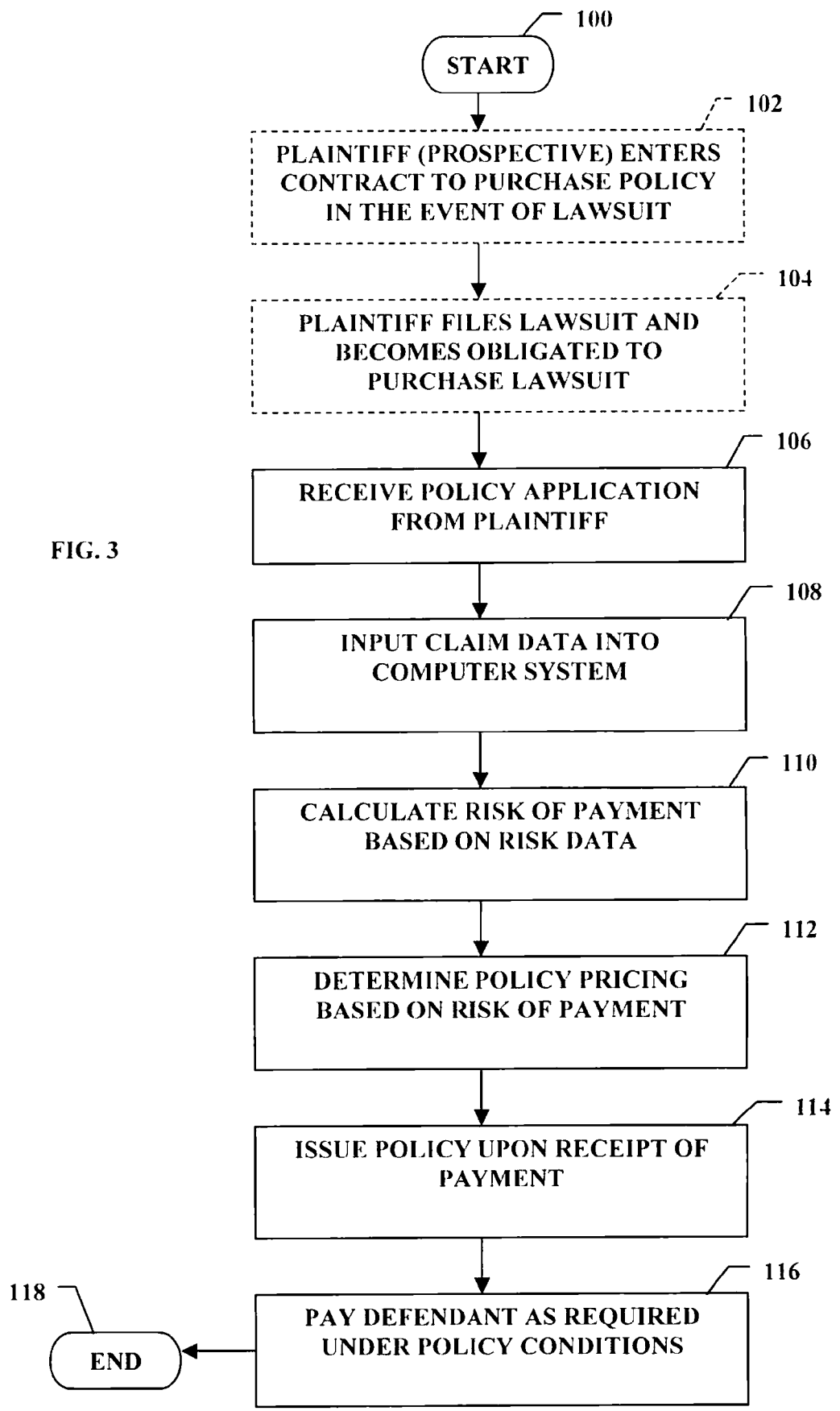
FIG. 3 is a flow diagram of a method for facilitating the underwriting of a defendant protection policy, according to a method aspect of the present invention.

The overall operation of the system of FIGS. 1 and 2 will be described in connection with FIG. 3. Referring to FIG. 3, a method for facilitating the underwriting of a defendant protection policy begins at block 100. As a preliminary step, at block 102, a plaintiff enters into a contract to purchase a defendant protection policy in the event the plaintiff brings a lawsuit. At this point, the plaintiff is a prospective plaintiff and has entered into the contract as a condition for receiving goods or services from a corresponding prospective defendant. This contract could be entered into by, for example, signing a physical or electronic contract, or by some behavior indicating acceptance of a contract. For example, by entering onto premises or opening product packaging after being informed that such an action constitutes an acceptance. The plaintiff may also be required to purchase such a policy by operation of law.

At block 104, the plaintiff has opted to bring a lawsuit against the defendant. By filing the lawsuit, the plaintiff becomes obligated, based on the contract, to purchase a defendant protection policy. Failure to do so could be used by the defendant as the basis for a motion to dismiss the lawsuit and/or a separate action for breach of contract. It will be appreciated that the terms of the contract may vary regarding when the obligation is incurred, and that it need not necessarily be triggered only by the actual filing of a lawsuit. It could also be triggered, for example, by providing the defendant written notice of claim or by commencing discovery after the filing of a lawsuit, or at the completion of discovery.

At block 106, the insurer receives a policy application from the plaintiff. The policy application will allow the insurer to determine certain claim data, for instance the type of claim (e.g., a specific type of medical malpractice, products liability based on injury from a particular product, negligence based on a particular alleged failure on the part of the defendant), the identity of the plaintiff, the identity of the plaintiff's attorney, the identity of the court where the suit was filed (e.g., the name of the court and the identity of the judge). At block 108, the claim data is inputted.

At block 110, the risk of payment is calculated based at least in part of the claim data. The risk data (derived, for example, from legal databases) can include, for instance, success rates for that type of claim. Success rates indicate the likelihood that a given plaintiff may succeed or fail with that type of claim. The standard for success of failure can vary, with an action unfavorable to a plaintiff under the policy ranging from anything less than a favorable judgment for the plaintiff to a favorable judgment for the defendant. For instance, a particular defendant protection policy could require payment under the policy if the plaintiff receives an unfavorable judgment in the lawsuit (e.g., in a verdict or on summary judgment), has the case dismissed or withdraws the case). Such data would correspond to the claim type from the claim data.

The risk data could also include data for the specific plaintiff and/or the plaintiff's attorney. For example, a plaintiff who has brought several unsuccessful lawsuits, or who is represented by an attorney who has brought several unsuccessful lawsuits, may be considered a higher risk by the insurer. This risk data would correspond to the plaintiff identity and plaintiffs attorney identity from the claim data.

The risk data could further include data for the particular court, both for the specific court (e.g., a particular division of a state or federal court) and for the judge; this would correspond to the court identity claim data. Where a particular court or judge is more favorable to plaintiffs and/or to particular claim types, this may raise the insurer's risk of payment.

It will be appreciated that additional factors could be employed, and particular risk calculations determined as known in actuarial science. Additionally, a confidence factor could be applied based on the risk data. For instance, where there some risk data is unavailable or where the amount of risk data falls below a given threshold, the confidence in the risk calculations may be lower. Accordingly, the potential risk that the insurer will have to pay out of the policy may be higher than represented. The confidence factor would adjust the insurer payment risk upwards to accommodate for this uncertainty.

Determining risk can additionally involve not only assessing the probability that the insurer will have to pay, but also the amount the insurer will be required to pay. This may be straightforward for some defendant protection policies, for instance, if the payment to the defendant is a fixed value—for example, the alleged amount of the plaintiff's claim for damages. However, the payment may be variable. For instance, the payment could be the actual defense costs of the plaintiff, or defense costs plus lost time and business. In such instances, calculating payment risk also involves estimating the payment amount. This can involve consideration of additional risk data such as the average length of proceedings for particular claim types and average legal fees in a particular area per unit time.

Additionally, the risk data can include particular information regarding the quality of the plaintiff's evidence. For the claim type, the elements of the claim can be compared to the evidence the plaintiff possesses for each element. This may result in a modification for the risk. Such a determination is likely to highly fact specific, and may require personal analysis. Accordingly, the insurer may require an additional underwriting fee if the plaintiff desires to take advantage of the opportunity to demonstrate that strong evidence should result in a lower policy price.

At block 112, policy pricing is determined based at least in part of the insurer risk of payment. Once the policy is priced, the policy will be issued to the plaintiff upon receipt of payment (block 114). In some circumstances, were the risk of payment is very high (typically indicative of a low likelihood of success), the plaintiff may determine that the lawsuit is not worth pursuing. If legally permissible, the plaintiff's attorney may have the option of covering all or a portion of the policy pricing if the plaintiffs attorney believes that the claim is likely to succeed. However, the plaintiff's attorney may also be deterred by a high policy cost. In this case, however, an object of the invention is satisfied and a plaintiff is discouraged from bringing a less than meritorious lawsuit. Where the risk of payment is lower, the policy pricing will be lower and correspondingly, the plaintiff and/or plaintiff's attorney will be more willing to buy the defendant protection policy and proceed with litigation.

At block 116, the lawsuit is resolved. As discussed above, the lawsuit may be resolved in various ways including settlement, withdrawal by the plaintiff, dismissal, or a judgment in favor of the plaintiff or the defendant. The insurer will pay upon resolution as required by the conditions of the particular defendant protection policy.

The above embodiments are provided for illustrative and exemplary purposes; those skilled in the art will appreciate that the present invention is not necessarily limited thereto. Numerous modifications, as well as adaptations for particular circumstances, are possible within the scope of the invention as herein shown and described, and within the scope of the appended claims.

What is claimed is:

1. A method for facilitating insurance underwriting for a litigation defendant protection policy, the method comprising:
   receiving an application for the litigation defendant protection policy;
   inputting claim data about a litigation claim into a computer system;
   using the computer system to calculate insurer risk of payment under the claim based at least in part on risk data corresponding to the claim data;
   using the computer system to determine policy pricing based at least in part of the calculated insurer risk of payment; and
   issuing the litigation defendant protection policy to the plaintiff upon receipt of payment; and
   paying a defendant as required under conditions of the defendant protection policy;
   wherein the plaintiff is obligated to purchase the defendant protection policy based on a prior contractual agreement with the defendant.

2. The method of claim 1, wherein the insurer risk of payment is calculated based at least in part of determining a probability of an outcome unfavorable to the plaintiff and a payment amount.

3. The method of claim 2, wherein the payment amount is a fixed amount based on the conditions of the defendant protection policy.

4. The method of claim 2, wherein the payment amount is estimated by the computer system based at least in part on the risk data.

5. The method of claim 4, wherein the payment estimation includes an estimation of defense costs.

6. The method of claim 1, further comprising inputting the risk data into the computer system.

7. The method of claim 6, wherein the computer system searches court records for at least a portion of the risk data.

8. The method of claim 1, wherein the prior contractual agreement is a precondition to the plaintiff receiving goods or services from the defendant.

* * * * *